United States Patent
Bouzguarrou et al.

(10) Patent No.: US 10,853,076 B2
(45) Date of Patent: Dec. 1, 2020

(54) PERFORMING AT LEAST TWO BRANCH PREDICTIONS FOR NON-CONTIGUOUS INSTRUCTION BLOCKS AT THE SAME TIME USING A PREDICTION MAPPING

(71) Applicant: Arm Limited, Cambridge (GB)

(72) Inventors: Houdhaifa Bouzguarrou, Valbonne (FR); Guillaume Bolbenes, Antibes (FR); Eddy Lapeyre, Antibes (FR); Luc Orion, Sartoux (FR)

(73) Assignee: Arm Limited, Cambridge (GB)

( * ) Notice: Subject to any disclaimer, the term of this patent is extended or adjusted under 35 U.S.C. 154(b) by 157 days.

(21) Appl. No.: 15/900,914

(22) Filed: Feb. 21, 2018

(65) Prior Publication Data
US 2019/0258485 A1    Aug. 22, 2019

(51) Int. Cl.
*G06F 9/38*    (2018.01)

(52) U.S. Cl.
CPC .......... *G06F 9/3806* (2013.01); *G06F 9/3844* (2013.01)

(58) Field of Classification Search
CPC .............................. G06F 9/3844; G06F 9/3806
See application file for complete search history.

(56) References Cited

U.S. PATENT DOCUMENTS

| | | | | |
|---|---|---|---|---|
| 5,434,985 A * | 7/1995 | Emma | .................... | G06F 9/3806 712/215 |
| 5,553,253 A * | 9/1996 | Pan | ....................... | G06F 9/3848 712/240 |
| 6,044,459 A * | 3/2000 | Bae | ....................... | G06F 9/3806 712/237 |
| 6,101,577 A * | 8/2000 | Tran | ....................... | G06F 9/3802 711/125 |
| 6,157,998 A * | 12/2000 | Rupley, II | ............. | G06F 9/3844 712/23 |
| 6,957,327 B1 * | 10/2005 | Gelman | ................ | G06F 9/3844 712/238 |
| 7,035,997 B1 * | 4/2006 | Musoll | .................. | G06F 9/3802 712/205 |
| 7,783,870 B2 * | 8/2010 | Levitan | ................. | G06F 9/3804 712/238 |
| 2005/0125646 A1 * | 6/2005 | Yokoi | ................... | G06F 9/3848 712/239 |
| 2006/0200655 A1 * | 9/2006 | Smith | ..................... | G06F 9/321 712/238 |

(Continued)

OTHER PUBLICATIONS

André Seznec, Stéphan Jourdan, Pascal Sainrat, and Pierre Michaud. Multiple-block ahead branch predictors. In Proceedings of the seventh international conference on Architectural support for programming languages and operating systems (ASPLOS VII). ACM, New York, NY, USA, 116-127. (Year: 1996).*

(Continued)

*Primary Examiner* — Keith E Vicary
(74) *Attorney, Agent, or Firm* — Nixon & Vanderhye P.C.

(57) ABSTRACT

An apparatus is provided to perform branch prediction in respect of a plurality of instructions divided into a plurality of blocks. Receiving circuitry receives references to at least two blocks in the plurality of blocks. Branch prediction circuitry performs at least two branch predictions at a time. The branch predictions are performed in respect of the at least two blocks and the at least two blocks are non-contiguous.

12 Claims, 6 Drawing Sheets

| Cycle | 0 | 1 | 2 | 3 | 4 | 5 | 6 | 7 | 8 | 9 |
|---|---|---|---|---|---|---|---|---|---|---|
| Address1 | #A | #A+2 | #A | #A+2 | #A | #A+2 | #A+1 | #A | #A+2 | #A+1 |
| Address2 | #A+1 | ~~#A+3~~ | #A+1 | ~~#A+3~~ | #A+1 | #A | #A+2 | #A+1 | #A | #A+2 |
| BSC | | Note last predicted taken | | store | | hit/use | | | hit/use | |

(56) References Cited

U.S. PATENT DOCUMENTS

| | | | | |
|---|---|---|---|---|
| 2007/0266228 A1* | 11/2007 | Smith | ................... | G06F 9/3806 |
| | | | | 712/238 |
| 2008/0077781 A1* | 3/2008 | Smith | ................ | G06F 9/30058 |
| | | | | 712/239 |
| 2016/0378491 A1* | 12/2016 | Burger | ................. | G06F 9/3802 |
| | | | | 712/1 |
| 2017/0083315 A1* | 3/2017 | Burger | .................... | G06F 9/268 |
| 2017/0083337 A1* | 3/2017 | Burger | .................... | G06F 9/268 |

OTHER PUBLICATIONS

S. Wallace and N. Bagherzadeh, "Multiple branch and block prediction," Proceedings Third International Symposium on High-Performance Computer Architecture, San Antonio, TX, USA, pp. 94-103. (Year: 1997).*

N. Ranganathan, D. Burger and S. W. Keckler, "Analysis of the TRIPS prototype block predictor," 2009 IEEE International Symposium on Performance Analysis of Systems and Software, Boston, MA, pp. 195-206. (Year: 2009).*

\* cited by examiner

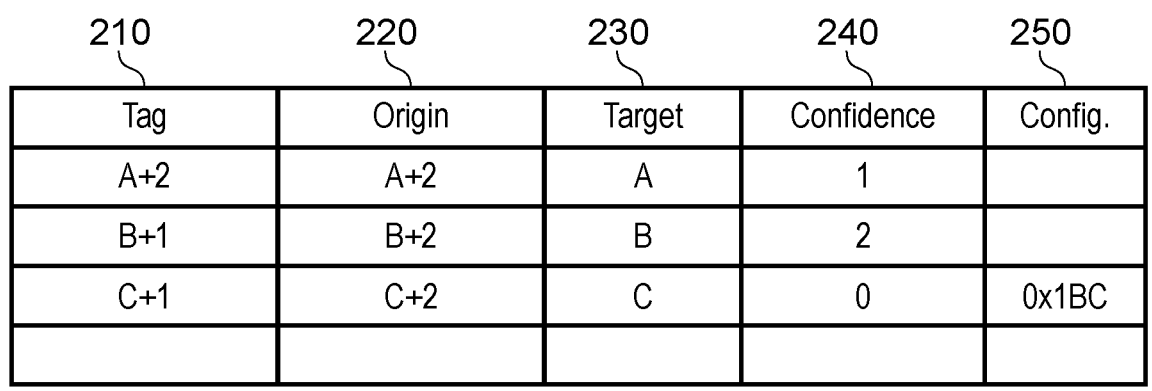
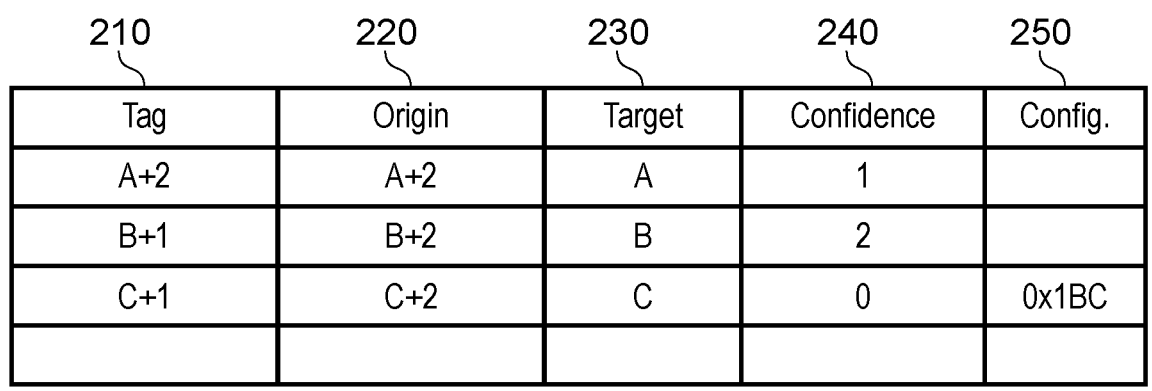
FIG. 2

PERFORMING AT LEAST TWO BRANCH PREDICTIONS FOR NON-CONTIGUOUS INSTRUCTION BLOCKS AT THE SAME TIME USING A PREDICTION MAPPING

TECHNICAL FIELD

The present disclosure relates to data processing.

DESCRIPTION

Branch prediction makes it possible to predict the results associated with a branch instruction in a block of program instructions. Without branch prediction, it may be necessary to wait for the branch instruction to be executed before it can be determined where the execution of instructions should continue. During this period, no instruction execution would be performed. If bandwidth permits, it may be possible for the branch predictor to provide predictions in respect of two blocks of code at a time.

Conventionally, this has been carried out for a next predicted block X and the following block, X+1. However, there is a chance that a branch will occur in block X, in which case block X+1 will not be executed and the prediction performed in respect of that block will be flushed. The present invention seeks to improve the useful bandwidth of the branch predictor.

SUMMARY

Viewed from a first example configuration, there is provided an apparatus to perform branch prediction in respect of a plurality of instructions divided into a plurality of blocks, the apparatus comprising: receiving circuitry to receive references to at least two blocks in the plurality of blocks; and branch prediction circuitry to perform at least two branch predictions at a time in respect of the at least two blocks, wherein the at least two blocks are non-contiguous.

Viewed from a second example configuration, there is provided a method of performing branch prediction in respect of a plurality of instructions divided into a plurality of blocks, the method comprising: receiving references to at least two blocks in the plurality of blocks; and performing at least two branch predictions at a time in respect of two blocks in the plurality of blocks, wherein the two blocks are non-contiguous.

Viewed from a third example configuration, there is provided an apparatus to perform branch prediction in respect of a plurality of instructions divided into a plurality of blocks, the apparatus comprising: means for receiving references to at least two blocks in the plurality of blocks; and means for performing at least two branch predictions at a time in respect of the at least two blocks, wherein the two blocks are non-contiguous.

BRIEF DESCRIPTION OF THE DRAWINGS

The present invention will be described further, by way of example only, with reference to embodiments thereof as illustrated in the accompanying drawings, in which:

FIG. 2 provides an example of a lookup table, which is used by branch sequence circuitry;

DESCRIPTION OF EXAMPLE EMBODIMENTS

Figure 1:
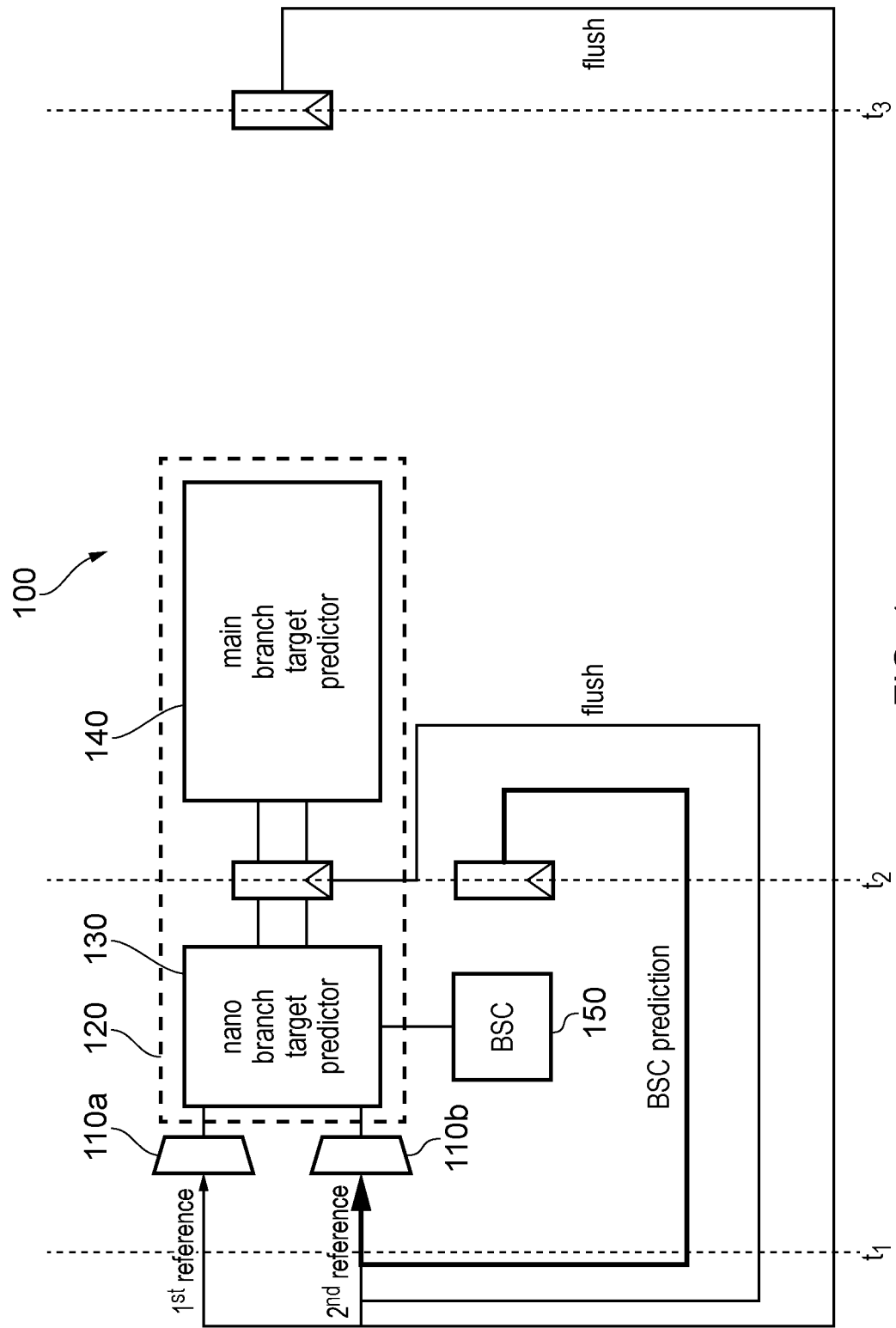
FIG. 1 illustrates an apparatus in accordance with some embodiments.

Before discussing the embodiments with reference to the accompanying figures, the following description of embodiments is provided.

In accordance with one example configuration there is provided an apparatus to perform branch prediction in respect of a plurality of instructions divided into a plurality of blocks, the apparatus comprising: receiving circuitry to receive references to at least two blocks in the plurality of blocks; and branch prediction circuitry to perform at least two branch predictions at a time in respect of the at least two blocks, wherein the at least two blocks are non-contiguous.

In this example configuration, instructions are divided into blocks. Each block comprises one or more instructions. In some embodiments, each of the blocks contains the same number of instructions based on the trailing bits of the address at which the instructions are located. The branch prediction circuitry is able to perform at least two branch predictions at a time. In some embodiments, this may be described as being simultaneous or substantially simultaneous. In some embodiments, the branch predictions at least partially overlap—either with all the other branch predictions being performed at the same time or, in other embodiments, with at least one of the branch predictions being performed at the same time. In any event, rather than performing the predictions in respect of a first block X and a second block X+1 that immediately follows block X, the branch predictor performs two predictions at the same time—one on a block X and one on another block Z (which is other than X+1). Accordingly, given a block X, the branch predictor does not merely perform prediction on a block X+1 due to the fact that it follows block X. In this way, the branch predictor is able to take into account the fact that a branch could occur in block X itself and thereby make a more informed decision regarding the predictions to be performed.

In some embodiments, the apparatus comprises branch sequence circuitry to provide a reference to one of the two blocks to the branch prediction circuitry in dependence on a reference to a recently encountered block. The branch sequence circuitry is thereby able to guide the behaviour of the branch prediction circuitry in respect of the blocks for which the predictions are to be performed. This guidance is provided by giving the branch sequence circuitry information on a recently encountered block.

In some embodiments, the recently encountered block is a most recently encountered block relating to a predicted taken branch. For example, based on the most recent branch instruction encountered that is predicted to be followed, it is possible to determine the instructions that will be encountered until the next branch instruction occurs—at which point the predicted program flow becomes uncertain. Hence, by considering the recently encountered block as the most recently encountered block that relates to a predicted taken branch, it is possible to know which other branch instructions will soon occur and thereby which predictions should be performed next. In some embodiments, the relationship is that the block contains a branch that is predicted to be taken. In other embodiments, the relationship is that the block is the target of a branch that is predicted to be taken.

In some embodiments, the reference to the recently encountered block containing the predicted taken branch comprises an address of the predicted taken branch.

In some embodiments, the branch sequence circuitry comprises a lookup table comprising a plurality of mappings, each of the mappings comprising a tag and a mapped prediction comprising a reference to an origin block and a reference to a destination block. The tag can be used to look up a particular mapped prediction. The origin block of each mapped prediction can indicate a block containing a branch instruction. Meanwhile, the destination block of each mapped prediction can represent the end point or destination of the branch instruction, e.g. the location to where the branch instruction should cause the program flow to jump.

In some embodiments, the lookup table is fully associative. Consequently, any particular entry can be stored in any location within the lookup table. In contrast, in other embodiments, a set-associative or direct-mapped lookup table is used. Such embodiments can improve lookup speed (or circuitry complexity) at the cost of having less storage available for any given entry.

In some embodiments, the branch sequence circuitry is adapted to return the reference to the destination block of one of the mappings where the tag corresponds with the reference to the recently encountered block. Such embodiments recognise that if a block X contains a branch instruction that branches from block X to block Z, and if that branch instruction has previously been predicted as being taken, then it is likely that the next blocks to consider for branch prediction should be block X itself and block Z, since previous behaviour would suggest that execution of block X will be followed by execution of block Z rather than block X+1. Accordingly non-contiguous blocks are passed into the branch predictor.

In some embodiments, the branch sequence circuitry is adapted to add a new mapping comprising one of the two branch predictions as the mapped prediction to the lookup table in the absence of the mappings already comprising the one of the two branch predictions; and the tag of the new mapping corresponds with the reference to the recently encountered block. As a result of the branch predictor making a prediction of a branch, the lookup table is updated. If there isn't an existing entry in respect of the prediction that was made then a new entry is added. The entry is tagged by the reference to the recently encountered block. Thus, on encountering the block again in the future, it will be known that the predicted branch may be predicted to occur again, and this can in turn affect the blocks that are passed to the branch predictor. In some embodiments (as described in more detail below) if an entry already exists then the entry is updated, e.g. to improve its confidence.

In some embodiments, each of the mappings comprises a confidence comprising a plurality of levels; and the branch sequence circuitry is adapted to return the reference to the destination block in further dependence on the confidence. In this way, it is possible to limit the output of the branch sequence circuitry if there is insufficient confidence that the prediction is accurate, cause outputs to only be provided if there is sufficient confidence that the prediction is accurate, or to in other ways affect the output based on the confidence value.

There are a number of ways in which this can be achieved. However, in some embodiments, the branch sequence circuitry is adapted to return the reference to the destination block in further dependence on the confidence being higher than the lowest of the plurality of levels. In other words, if the confidence is lower than a particular level, then the reference to the destination block is not returned. This may cause the branch predictor to be passed a block X and the block X+1 following that block.

In some embodiments, the confidence of a mapping is increased in response to the branch predictor subsequently predicting the mapped prediction of that mapping; and the confidence of a mapping is decreased in response to the branch predictor subsequently failing to predict the mapped prediction of that mapping. Thus, the confidence might provide a "running score" as to how accurate the prediction has been so far. In some embodiments, the confidence may be capped (at a positive level, a negative level, or both a positive and a negative level) such that the confidence cannot exceed or drop below particular points.

In some embodiments, each of the mappings comprises branch prediction configuration data; and in response to the branch sequence circuitry returning one of the two blocks, the branch prediction circuitry is configured to perform the prediction for the one of the two blocks using the corresponding branch prediction configuration data.

For example, in some embodiments, the configuration data could indicate how the branch predictor is to be executed. E.g. the branch predictor may disable or enable the use of a conditional branch predictor depending on whether it is necessary for the particular block. By disabling the conditional branch predictor where appropriate, further power savings can be made.

In some embodiments, the branch sequence circuitry is adapted to provide one of the two blocks in a cycle before the one of the two blocks is provided to the branch prediction circuitry. In some instances, it may be known that the next branch to be encountered will be in several cycles (e.g. one or more cycles) time. For instance, if a branch is followed by a number of blocks that do not contain branches, or contain branches that are predicted not to be followed, and then a further block with a branch is encountered then it is possible to provide the reference to one of the two blocks in one or more cycles before the further block is actually encountered.

In some embodiments, the branch prediction circuitry is adapted to perform N branch predictions at a time in respect of N blocks in the plurality of blocks; and the branch sequence circuitry is adapted to provide references to M of the N blocks in dependence on the reference to the recently encountered block, wherein M<=N; and the N blocks are non-contiguous. Such embodiments expand on the above concept in order to even further improve on bandwidth usage by making it possible to usefully perform predictions on N blocks at the same time. If, for instance, on encountering a block, it can be determined that several other blocks will or could follow, then references to each of those blocks could be provided to the branch predictor.

Particular embodiments will now be described with reference to the figures.

FIG. 1 illustrates an apparatus 100 in accordance with some embodiments. The apparatus 100 is to provide branch prediction for a set of instructions divided into blocks. This division could occur, for instance, by grouping instructions according to the most significant bits of the memory address at which each instruction is located. The apparatus 100 includes receiving circuitry in the form of a pair of multiplexers 110a, 110b and branch prediction circuitry 120 comprising a nano branch target predictor 130 which comprises a nano branch target buffer (nBTB) and a main branch target predictor 140 which comprises a main branch target buffer (mainBTB). The multiplexers 110a, 110b each receive a set of signals and choose between these signals to control the branch prediction circuitry 120. The multiplexers 110a, 110b each pass a reference to a block of one or more instructions, thereby enabling two references to blocks to be passed to the nano branch target predictor 130. The nano branch target predictor 130 is provided as a mechanism to more quickly return branch prediction results than is possible from the main branch target predictor 140. However, the nano branch target predictor 130 is less complex than the main branch target predictor 140 and hence can produce less accurate predictions than is possible with the main branch target predictor. Hence, references to blocks are passed to the nano branch target predictor 130 to provide an initial prediction and then passed to the main branch target predictor 140 to provide a more accurate prediction after a further period of time.

In this embodiment, the multiplexer 110a receives, at a time $t_1$, a reference to a first block X. At the same time, the multiplexer 110b receives a reference to the block following block X, i.e. block X+1. In addition, the block sequence circuitry 150 may, in certain circumstances, provide another reference to a block Z, which does not follow block X. The receiving circuitry 110b will provide the reference to the block Z in preference to the reference to the block X+1 to the branch prediction circuitry 120. These are provided to the nano branch target predictor 130, which outputs its predictions at a time $t_2$. The branch sequence circuitry 150 also makes a determination as to whether the 2nd reference should be overridden. In particular, if the most recently encountered block (the block referred to by the $1^{st}$ reference) is known to have previously contained a branch that was taken, then it may be assumed that the 2nd reference, which is to the block following the block referred to by the $1^{st}$ reference, is incorrect and should be overridden. Again, using the same example as earlier, consider that the $1^{st}$ reference is to a block X, and the $2^{nd}$ reference is initially to the following block X+1. If the block sequence circuitry 150 determines that block X contains a previously taken branch, then the block sequence circuitry 150 outputs a replacement $2^{nd}$ reference to a block Z (the target of the branch) to the receiving circuitry 110b. The receiving circuitry will select the output of the branch sequence circuitry 150 over the default $2^{nd}$ reference, and so the reference to block Z will be propagated to the branch prediction circuitry 120. Block Z does not follow block X and the two blocks are non-contiguous.

At a time $t_2$, the output of the nano branch target predictor 130 is provided. This could determine that the $2^{nd}$ reference (which could be provided by the branch sequence circuitry 150) is incorrect. In which case, the $2^{nd}$ reference must be flushed, and a new $2^{nd}$ reference provided. In either case, the predictions are passed to the slower acting main branch target predictor 140. At a time $t_3$, the results of this main branch target predictor 140 are known, and again, a flush could be performed on the $2^{nd}$ reference. It will also be appreciated that even after the predictions have been performed, a flush might still occur after the branch instruction has actually been executed, since all of the predictions could be incorrect. Such flushes can be inefficient since they represent a loss in effective bandwidth of the branch prediction circuitry 120 due to the $2^{nd}$ reference being overwritten or replaced by a reference to a block that will actually be encountered soon as opposed to a block that was incorrectly expected to be encountered soon. The multiplexers 110a, 110b are configured to differentiate between signals that pass references to blocks and signals that cause flushes to occur in the branch prediction circuitry 120.

The present technique seeks to reduce the bandwidth loss. Rather than merely assuming that the $2^{nd}$ reference should always be to a block that follows the block referred to by the $1^{st}$ reference, the branch sequence circuitry 150 performs its own prediction as to which block should be next to be considered for prediction. By providing an estimate as to the most appropriate block to perform prediction for, bandwidth wastage can be reduced.

FIG. 2 provides an example of a lookup table 200, which is used by branch sequence circuitry 150. The table comprises four columns: a tag 210, an origin 220, a target 230, and a confidence 240. The tag 210 controls how an entry is referenced or looked up in the table 200. In this embodiment, it corresponds with the most recently encountered (by the branch prediction circuitry 120) block that is the target of a branch that is predicted to be taken. The origin 220 indicates another block that contains a branch instruction. In this embodiment, having encountered the block referred to in the tag, it may be known that the origin block will be encountered. The target 230 refers to a block that is a target of the branch instruction that occurs in the origin block 220. Finally, the confidence 240 indicates the extent to which the entry having the corresponding tag, origin, and target is trusted, e.g. the extent to which it is predicted that having encountered the block listed in the tag 210, a branch will occur from the block listed in the origin 220 to the block listed in the target 230. There are a number of ways of measuring the confidence. However, in this embodiment, a saturating counter is used. The counter is saturated such that it cannot drop below 0 (the least confidence) and cannot increase above 3 (the most confidence). Whenever the prediction is shown to be wrong, the confidence drops and whenever the prediction is shown to be right, the confidence increases (subject to those limits). Also in this embodiment, a prediction with a confidence of 0 is 'masked' such that no prediction will be output by the branch sequence circuitry 150. A further, optional configuration 250 column can be provided with data to control branch prediction. For example, this column could include configuration data that is used to control the behaviour of the branch predictor, such as disabling conditional branch prediction for instance.

Figure 3:
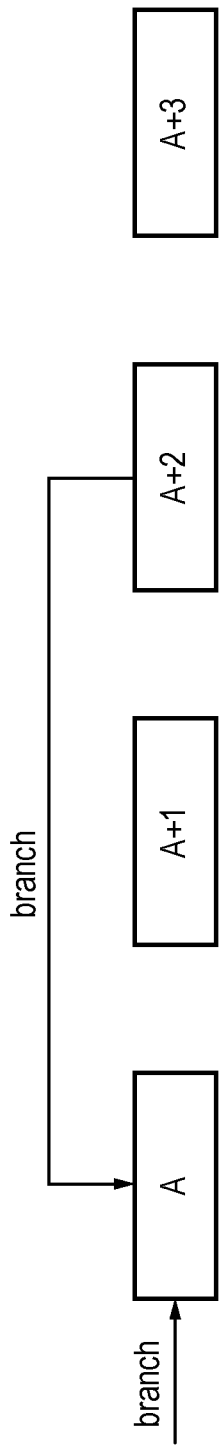
FIGS. 3A, 3B, and 3C illustrate an embodiment that demonstrates the use of the branch sequence circuitry.

FIGS. 3A, 3B, and 3C illustrate an embodiment that demonstrates the use of the branch sequence circuitry 150. FIG. 3A shows a program flow in which a branch initially occurs to a block A. The program then flows to block A+1 and to block A+2 without branching. Although block A+3 would ordinarily follow block A+2, the presence of a branch in block A+2 causes the flow to return to block A. FIG. 3B illustrates the inputs provided to the branch prediction circuitry 120 in the absence of the branch sequence circuitry 150 assuming that the branch sequence circuitry 150 can process two branch predictions at the same time. In a cycle 0, blocks A and A+1 are passed to the block prediction circuitry 120. In a cycle 1, blocks A+2 and A+3 are passed to the block prediction circuitry 120. However, when block prediction is performed on block A+2, it will be predicted that block A+3 will not be encountered due to the branch in block A+2. Accordingly, the request will be flushed and at a cycle 2, the correction will be processed—thereby causing blocks A and A+1 to be passed to the branch prediction circuitry 120. In the example shown in FIG. 3B, the loop repeats twice thereby causing the same error to be repeated twice and causing a further two flushes. Consequently, six useful predictions occur in 5 processor cycles, resulting in an average of 1.2 useful predictions per cycle. This is significantly smaller than the theoretical maximum of 2 useful predictions per cycle.

FIG. 3C illustrates how this problem can be inhibited with the use of the branch sequence circuitry 150. In FIG. 3C, the same process is followed. In a cycle 1, blocks A+2 and A+3 are passed to the block prediction circuitry 120. As before, block A+3 will be flushed. At this stage, the "last predicted taken branch" becomes # A+2, since this was the last block to contain a branch instruction that was predicted to be taken. The process then continues until cycle 3. In cycle 3, again, blocks A+2 and A+3 are sent to the branch prediction circuitry 120 since there is nothing in the branch sequence circuitry to indicate otherwise. Again, the entry # A+3 is flushed. This time, however, it is possible to store an entry in the branch sequence circuitry 150 since the last predicted taken branch is known. Accordingly, an entry is made into the lookup table 200 containing a tag 210 of A+2, an origin 220 of A+2, a target 230 of A, an initial confidence of 1. The process then continues until cycle 5. This time, since there is a hit, it is known not only that block A will follow, rather than block A+3, but that the next branch to be encountered that will be predicted as taken will be A+2 again in the next iteration of the loop. Hence, the prediction is known multiple cycles ahead of the branch actually being encountered. As a consequence of this, no flush occurs and hence 18 useful predictions are made in 10 cycles, thereby giving a useful bandwidth of 1.8 predictions per cycle. Note that in cycles 5 and 8, when the predictions are subsequently shown to be correct, the confidence value associated with those predictions is increased. It will be appreciated that cycle 7 also avoids submitting a reference to block A+3. This is because the nano branch target predictor 130 is able to provide the prediction of A+2 to A in the previous cycle. In these embodiments, the branch sequence circuitry 150 is used for the purposes of rectifying the $2^{nd}$ reference provided to the branch prediction circuitry 120.

Figure 4:
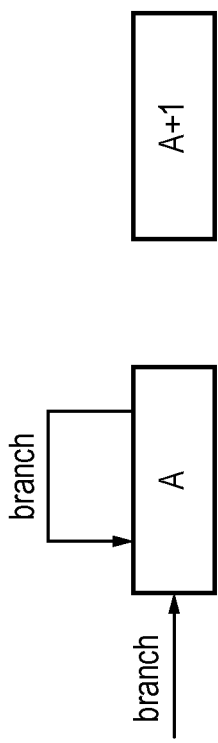
FIGS. 4A, 4B, and 4C show another example in which a block A loops back to itself rather than continuing to a block A+1.

FIGS. 4A, 4B, and 4C show another example in which a block A loops back to itself rather than continuing to a block A+1. In this example, as shown in FIG. 4B, without the branch sequence circuitry 150, it may be expected to achieve a useful prediction bandwidth of only 1.0 predictions per cycle due to flushing, despite the capacity being 2 predictions per cycle. However, by storing an entry in the lookup table in which the tag 210 has a value of A, the origin 220 has a value of A, and the target has a value of A, it is possible to increase the useful predictions per cycle (on average) to 2 predictions per cycle, as shown in FIG. 4C.

Figure 5:
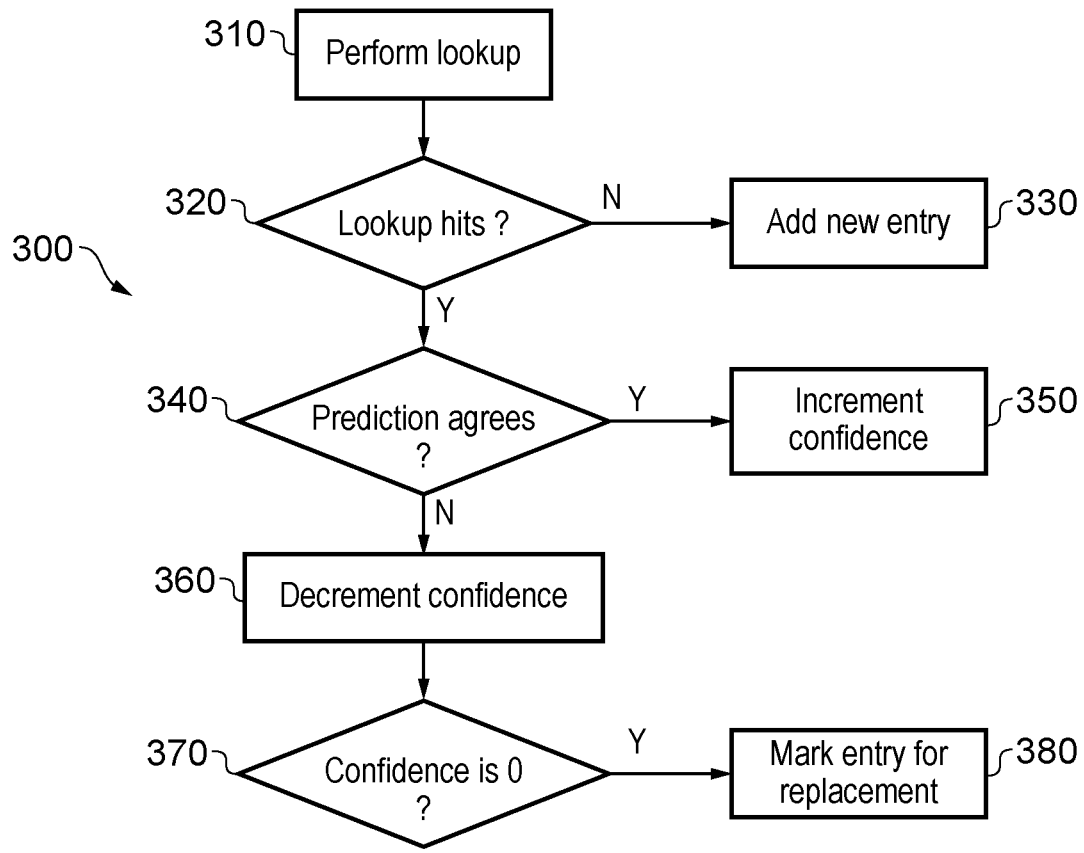
FIG. 5 provides a flow chart that illustrates the process of inserting and updating the lookup table.

FIG. 5 provides a flow chart 300 that illustrates the process of inserting and updating the lookup table 200. When a branch prediction is made (e.g. by the main branch target predictor 140), a lookup is performed on the lookup table at step 310 using the most recent block having a predicted taken branch. If the lookup misses at step 320, then there is no corresponding entry and so a new entry is added at step 330. If the lookup hits, and the branch prediction agrees with the hit in the lookup table 200 at step 340 then the confidence value is incremented in step 350. Otherwise, at step 360, the confidence is decremented. If, at step 370, it is determined that the confidence value is 0 (e.g. the lowest level) then at step 380 that entry is marked for replacement.

Figure 6:
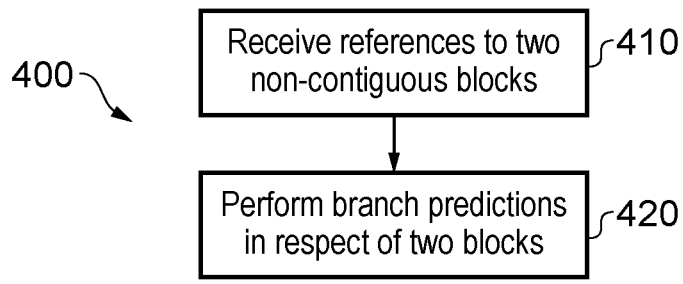
FIG. 6 provides a flow chart that illustrates a method in accordance with some embodiments.

FIG. 6 provides a flow chart 400 that illustrates a method in accordance with some embodiments. At a step 410, references to two non-contiguous blocks are received, e.g. by the multiplexers 110a, 110b. Then, at a step 4210, branch predictions are performed in respect of those two blocks at the same time, e.g. by branch prediction circuitry 120.

Figure 7:
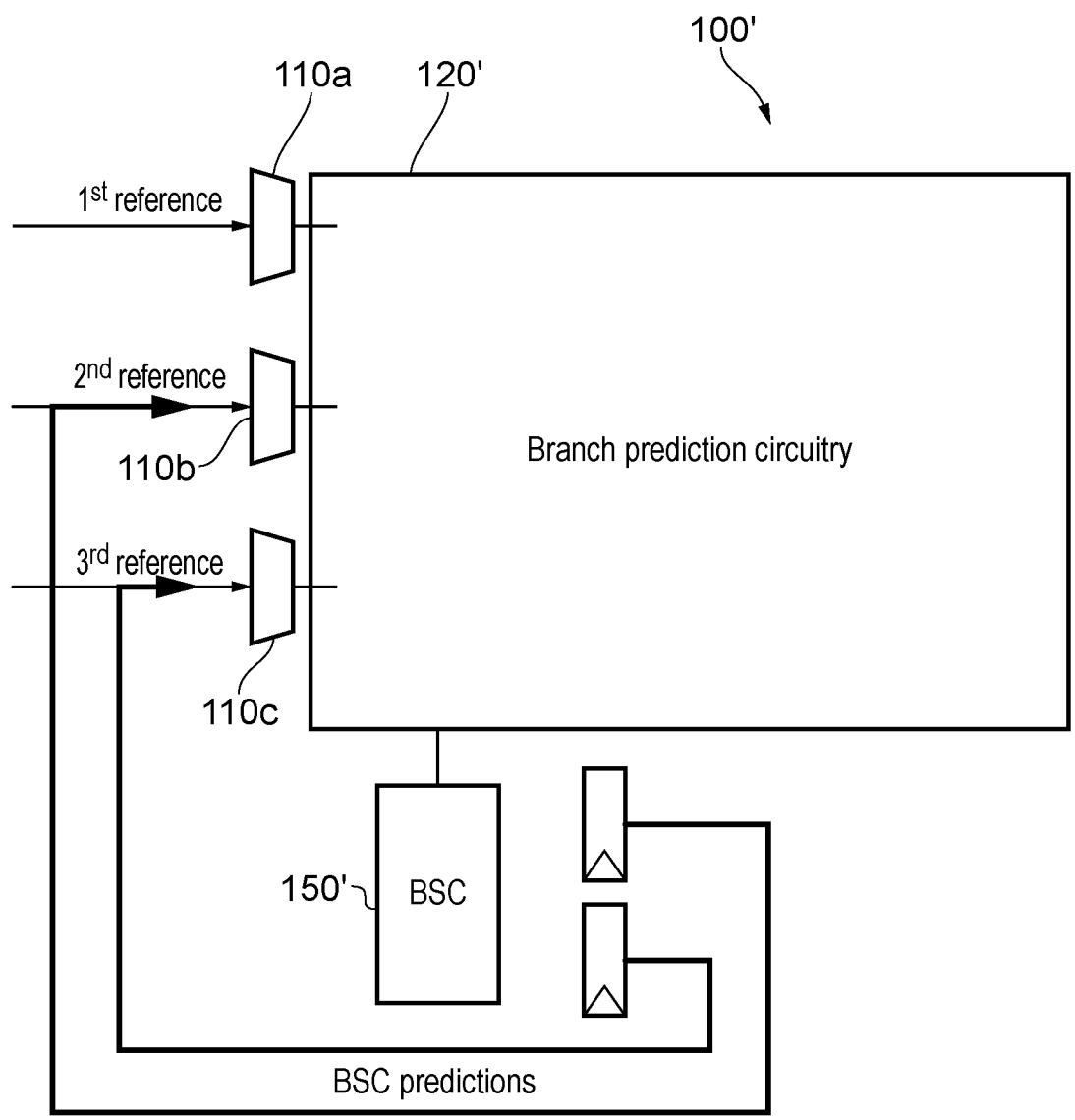
FIG. 7 shows another example of an apparatus according to some embodiments.

FIG. 7 shows another example of an apparatus 100' according to some embodiments. Here, the branch prediction circuitry 120' is able to process three predictions at the same time. Furthermore, the branch sequence circuitry 150' outputs two predictions, which can be overridden by the input circuitry in the form of multiplexers 110b, 110c. In general, of course, it will be appreciated that for branch prediction circuitry that is able to process N branch predictions at the same time, the branch sequence circuitry can output M predictions (M<N) of references to blocks.

Note that in these embodiments, references to blocks have been used in, for instance, the tag 210, origin 220, and target 230 of the lookup table. In these embodiments, the blocks represent the most significant bits of memory addresses. Accordingly, these references (A, B, A+1, etc.) can be viewed as examples of memory addresses. In other embodiments, full memory addresses that indicate the address locations of instructions can be provided. In effect, such embodiments consider blocks each having a single address.

In accordance with the above description, it can be seen that by using information relating to previous branch behaviour in order to provide non-contiguous block references to the branch target predictor 120 it is possible to improve the useful bandwidth of the branch target predictor—avoiding flushes. Accordingly, energy is used more efficiently.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus to perform branch prediction in respect of a plurality of instructions divided into a plurality of blocks, the apparatus comprising:
   receiving circuitry to receive references to at least two blocks in the plurality of blocks;
   branch prediction circuitry to perform at least two branch predictions at a time in respect of the at least two blocks; and
   branch sequence circuitry comprising a lookup table comprising a plurality of mappings, each of the mappings comprising a tag and a mapped prediction comprising a reference to an origin block and a reference to a destination block, wherein the branch sequence circuitry is adapted to provide, by accessing the lookup table, a reference to one of the at least two blocks to the branch prediction circuitry in dependence on a reference to a most recently encountered block relating to a predicted taken branch, wherein
   the at least two blocks are non-contiguous.

2. The apparatus according to claim 1, wherein
the reference to the most recently encountered block relating to the predicted taken branch comprises an address of the predicted taken branch.

3. The apparatus according to claim 1, wherein
the lookup table is fully associative.

4. The apparatus according to claim 1, wherein
the branch sequence circuitry is adapted to return the reference to the destination block of one of the mappings where the tag corresponds with the reference to the most recently encountered block.

5. The apparatus according to claim 4, wherein
the branch sequence circuitry is adapted to add a new mapping comprising one of the at least two branch predictions as the mapped prediction to the lookup table in the absence of the mappings already comprising the one of the at least two branch predictions; and
the tag of the new mapping corresponds with the reference to the most recently encountered block.

6. The apparatus according to claim 1, wherein
each of the mappings comprises a confidence that is one of a plurality of levels; and
for a given one of the mappings, the branch sequence circuitry is adapted to return the reference to the destination block of the given one of the mappings in further dependence on the confidence of the given one of the mappings.

7. The apparatus according to claim 6, wherein
the branch sequence circuitry is adapted to return the reference to the destination block of the given one of the mappings in further dependence on the confidence of the given one of the mappings being higher than the lowest of the plurality of levels.

8. The apparatus according to claim 6, wherein
the confidence of a mapping is increased in response to the branch prediction circuitry subsequently correctly predicting the mapped prediction of that mapping; and
the confidence of the mapping is decreased in response to the branch prediction circuitry subsequently incorrectly predicting the mapped prediction of that mapping.

9. The apparatus according to claim 1, wherein
each of the mappings comprises branch prediction configuration data; and
in response to the branch sequence circuitry providing the reference to the one of the at least two blocks, the branch prediction circuitry is configured to perform a prediction for the reference to the one of the at least two blocks using the corresponding branch prediction configuration data.

10. The apparatus according to claim 1, wherein
the branch sequence circuitry is adapted to provide the reference to the one of the at least two blocks to the branch prediction circuitry in a cycle before the reference to the one of the at least two blocks is provided to the branch prediction circuitry by circuitry other than the branch sequence circuitry.

11. The apparatus according to claim 1, wherein
the branch prediction circuitry is adapted to perform N branch predictions at a time in respect of N blocks in the plurality of blocks; and
the branch sequence circuitry is adapted to provide references to M of the N blocks in dependence on the reference to the most recently encountered block, wherein
M<N; and
the N blocks are non-contiguous such that at least one of the N blocks is separated from another block of the N blocks by at least one block which is not part of the N blocks.

12. A method of performing branch prediction in respect of a plurality of instructions divided into a plurality of blocks, the method comprising:
receiving references to at least two blocks in the plurality of blocks;
performing at least two branch predictions at a time in respect of the at least two blocks in the plurality of blocks; and
accessing a lookup table in order to provide a reference to one of the at least two blocks to perform the at least two branch predictions in dependence on a reference to a most recently encountered block relating to a predicted taken branch, wherein
the at least two blocks are non-contiguous, and
the lookup table comprises a plurality of mappings, each of the mappings comprising a tag and a mapped prediction comprising a reference to an origin block and a reference to a destination block.

* * * * *